US011128937B2

(12) United States Patent
Kugler et al.

(10) Patent No.: US 11,128,937 B2
(45) Date of Patent: Sep. 21, 2021

(54) APPARATUS AND METHOD FOR MAINTAINING PARAMETER RANGES FOR REMOTE SENSING DEVICES

(71) Applicant: BlackBerry Limited, Waterloo (CA)

(72) Inventors: Andrew Kugler, Ottawa (CA);
Michael Brimner, Ottawa (CA)

(73) Assignee: BlackBerry Limited, Waterloo (CA)

( * ) Notice: Subject to any disclaimer, the term of this patent is extended or adjusted under 35 U.S.C. 154(b) by 58 days.

(21) Appl. No.: 16/546,090

(22) Filed: Aug. 20, 2019

(65) Prior Publication Data

US 2021/0058683 A1 Feb. 25, 2021

(51) Int. Cl.
| | |
|---|---|
| *G08B 1/08* | (2006.01) |
| *H04Q 9/02* | (2006.01) |
| *H04L 12/26* | (2006.01) |
| *H04W 8/24* | (2009.01) |
| *H04W 24/02* | (2009.01) |
| *H04W 84/18* | (2009.01) |

(52) U.S. Cl.
CPC ............ *H04Q 9/02* (2013.01); *H04L 43/08* (2013.01); *H04W 8/24* (2013.01); *H04W 24/02* (2013.01); *H04W 84/18* (2013.01)

(58) Field of Classification Search
CPC .......... H04Q 9/02; H04L 43/08; H04W 8/24; H04W 24/02; H04W 84/18
See application file for complete search history.

(56) References Cited

U.S. PATENT DOCUMENTS

| | | | | |
|---|---|---|---|---|
| 5,993,050 A | * | 11/1999 | Miura | G06F 30/23 |
| | | | | 703/2 |
| 6,107,925 A | * | 8/2000 | Wong | G08B 17/10 |
| | | | | 340/628 |
| 6,987,457 B2 | | 1/2006 | Yin et al. | |
| 7,969,296 B1 | * | 6/2011 | Stell | G08B 17/117 |
| | | | | 340/522 |
| 8,146,376 B1 | * | 4/2012 | Williams | F24F 11/30 |
| | | | | 62/157 |
| 8,374,823 B1 | * | 2/2013 | Williams | G06F 11/3058 |
| | | | | 702/187 |
| 9,864,730 B2 | * | 1/2018 | Garg | H04R 1/1016 |

(Continued)

FOREIGN PATENT DOCUMENTS

| | | |
|---|---|---|
| EP | 2370161 A2 | 10/2011 |
| WO | 2016172316 A1 | 10/2016 |

OTHER PUBLICATIONS

Zhang et al., Outlier Detection Techniques for Wireless Sensor Networks (Year: 2008).*

(Continued)

*Primary Examiner* — Quang Pham
(74) *Attorney, Agent, or Firm* — Borden Ladner Gervais LLP; Todd Keeler

(57) ABSTRACT

A method and apparatus for managing parameter ranges in a monitoring system includes storing a plurality of predetermined parameter ranges, receiving from a remote sensing device a measured parameter measured at the remote sensing device, determining a first parameter range based on the plurality of predetermined parameter ranges such that the measured parameter is within the first parameter range, transmitting a message to the remote sensing device that includes the first parameter range.

12 Claims, 3 Drawing Sheets

(56) References Cited

U.S. PATENT DOCUMENTS

| | | | | |
|---|---|---|---|---|
| 10,817,825 | B2* | 10/2020 | Shanmugavelayudam ................... H04W 52/0235 | |
| 11,024,141 | B2* | 6/2021 | Gonzales ............. G08B 17/117 | |
| 2003/0059637 | A1* | 3/2003 | Imai ........................ C08L 23/06 | 428/515 |
| 2003/0135377 | A1* | 7/2003 | Kurianski ............ G10H 1/0008 | 704/500 |
| 2014/0064199 | A1* | 3/2014 | Pan ....................... H04L 1/1867 | 370/329 |
| 2014/0155705 | A1 | 6/2014 | Papadopoulos et al. | |
| 2014/0275852 | A1 | 9/2014 | Hong et al. | |
| 2015/0105918 | A1* | 4/2015 | Lee .......................... F24F 11/70 | 700/276 |
| 2016/0262143 | A1* | 9/2016 | Breuer ................ H04W 72/085 | |
| 2017/0235598 | A1* | 8/2017 | Yang .................... G06F 9/4806 | 719/320 |
| 2017/0270262 | A1* | 9/2017 | Noh .................. A61B 5/02055 | |
| 2019/0240672 | A1* | 8/2019 | Reiter .................... B02C 25/00 | |
| 2019/0248208 | A1* | 8/2019 | Higashitani ........... B60W 10/04 | |
| 2019/0380661 | A1* | 12/2019 | Ahmad ................ A61B 5/7264 | |
| 2020/0001600 | A1* | 1/2020 | Arakane ............. B41J 2/16517 | |
| 2020/0100620 | A1* | 4/2020 | Alexander .......... A47J 36/2438 | |
| 2020/0109998 | A1* | 4/2020 | De Pau, Jr. ............ B64D 45/00 | |
| 2020/0279559 | A1* | 9/2020 | Kawano .................. G06F 3/012 | |
| 2020/0296301 | A1* | 9/2020 | Johnson ............... H04N 5/2628 | |
| 2020/0341460 | A1* | 10/2020 | Wang ................. G05B 23/0283 | |

OTHER PUBLICATIONS

Tsai et al., Sensor Abnormal Detection and Recovery Using Machine Learning for IoT Sensing Systems (Year: 2019).*
Li et al., A Low-Cost CMOS Programmable Temperature Switch (Year: 2008).*
IP com, Threshold Detector (Year: 1967).*
Knudson et al., Dynamic threshold implementation of the maximum-likelihood detector for the EPR4 channel (Year: 1991).*
Kohlstruck et al., The Selective Clustering Energy Detector for Cognitive Radio Networks—Conceptual Design and Experimental Assessment (Year: 2018).*
Shbat et al., Generalized Detector with Adaptive Detection threshold for radar sensors (Year: 2012).*
Umsonst et al., Finite sample guarantees for quantile estimation An application to detector threshold tuning (Year: 2021).*
European Patent Application No. 20191494.2, Extended European Search Report dated Dec. 21, 2020.

* cited by examiner

APPARATUS AND METHOD FOR MAINTAINING PARAMETER RANGES FOR REMOTE SENSING DEVICES

FIELD

The present disclosure relates to providing a parameter range to a remote sensing device.

BACKGROUND

Networks of wireless devices, or wireless nodes, have become more prevalent with the growth of the so called internet of things (IOT). Nodes that include sensors may be referred to as remote sensing devices. In order to prolong battery life, a remote sensing device may turn on its wireless transceivers periodically, which may be referred to as "waking up", to transmit the measured parameter. Further, the remote sensing device may wake up and transmit a parameter measured by the device if the parameter is determined to be outside of a parameter range stored at the remote sensing device. Oftentimes, remote sensing devices may be configured such that they can store only a single parameter range.

Improvements managing parameter ranges in remote sensing devices are desired.

BRIEF DESCRIPTION OF THE DRAWINGS

Embodiments of the present disclosure will now be described, by way of example only, with reference to the attached Figures.

DETAILED DESCRIPTION

Figure 1:
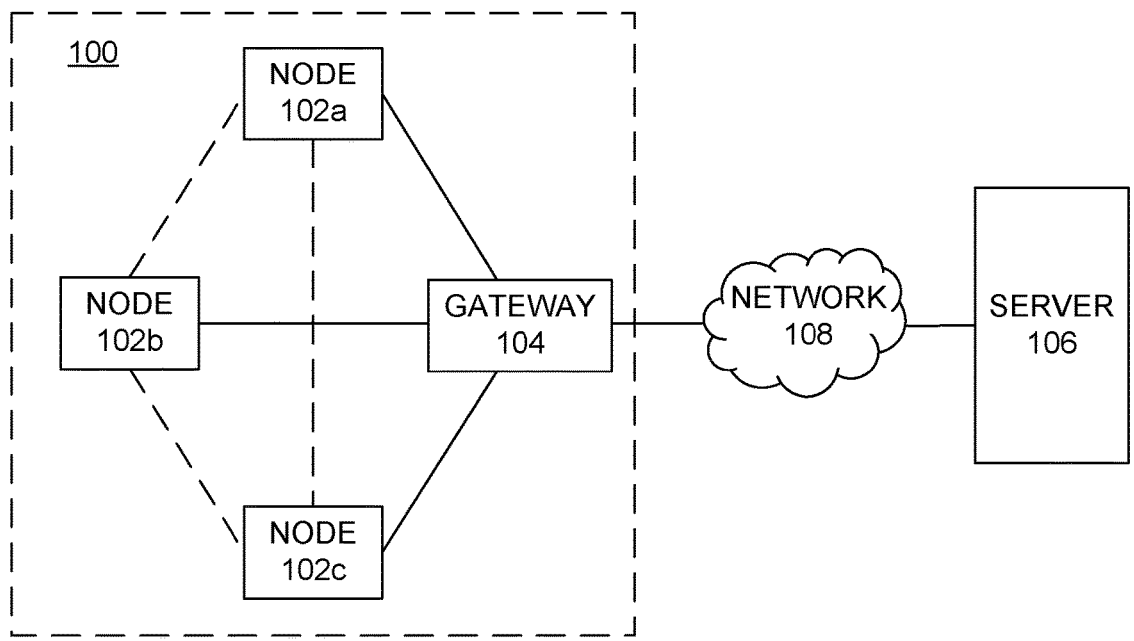
FIG. 1 is a block diagram of an example wireless node network in accordance with the present disclosure.

The present disclosure provides an apparatus and method for maintaining parameter ranges for remote sensing devices. According to the present disclosure, a plurality of predetermined parameter ranges may be stored remote to the remote sensing device such as, for example, at a server in communication with the remote sensing device. In response to receiving a measured parameter from a remote sensing device, a first parameter range is determined such that the received measured parameter is within the determined first range. The determined first range is then transmitted to the remote sensing device such that the remote sensing device may set a stored parameter range to the first parameter range. The remote sensing device may then utilize the first parameter range to, for example, compare measured parameter values to and determine whether to turn on a transceiver of the remote sensing device, also referred to as "waking up", and transmit the measured parameter. The measured parameter may be any suitable parameter capable of being measured by a remote sensing device including, for example, temperature, pressure, and humidity.

In an embodiment, the present disclosure provides a method for managing parameter ranges in a monitoring system that includes storing a plurality of predetermined parameter ranges, receiving from a remote sensing device a measured parameter measured at the remote sensing device, determining a first parameter range based on the plurality of predetermined parameter ranges such that the measured parameter is within the first parameter range, transmitting a message to the remote sensing device that includes the first parameter range.

In an example embodiment, receiving the measured parameter from a remote sensing device comprises receiving an alert that includes the measured parameter, the alert indicating that the measured parameter is outside of a second parameter range.

In an example embodiment, storing the plurality of predetermined parameter ranges comprises storing a predetermined upper bound and predetermined lower bound for each of the predetermined parameter ranges, and determining the first parameter range comprises determining a first upper bound and a first lower bound of the first parameter range from the predetermined upper bounds and the predetermined lower bounds.

In an example embodiment, a portion of the stored predetermined upper bounds and the stored predetermined lower bounds are associated with a first user of the monitoring system, and another portion of the stored predetermined upper bounds and the stored predetermined lower bounds are associated with a second user of the monitoring system.

In an example embodiment, the method further includes receiving a second measured parameter from the remote sensing device, wherein the second measured parameter is outside of the first parameter range, determining which of the first upper bound and the lower bound was crossed based on the second measured parameter, determining which of the first user and the second user is associated with the one of the first upper bound and the first lower bound determined to be crossed, and transmitting a message to the determined one of the first user and the second user that is associated with the one of the first upper bound and the first lower bound determined to be crossed indicating the one of the first upper bound and the first lower bound has been crossed.

In an example embodiment, receiving the second measured parameter comprises receiving an alert that includes the second measured parameter, the alert indicating that the second measured parameter is outside of the first parameter range.

In an example embodiment, determining the first upper bound comprises selecting a closest one of the predetermined upper bounds and predetermined lower bounds that is greater than the measured parameter, and determining the first lower bound comprises selecting a closest one of the predetermined upper bounds and the predetermined lower bounds that is less than the measured parameter.

In an example embodiment, when none of the predetermined upper bounds and predetermined lower bounds are greater than the measured parameter, the first upper bound is selected to be undefined, and when none of the predetermined upper bounds and predetermined lower bounds are less than the measured parameter, the first lower bound is selected to be undefined.

In an example embodiment, the first upper bound and first lower bound are both predetermined upper bounds or are both predetermined lower bounds.

In an example embodiment, the parameter is one of temperature, pressure, or humidity.

In another embodiment, the present disclosure provides an apparatus for managing parameter ranges in a monitoring system that includes a memory, and a processor in communication with the memory and configured to store a plurality of predetermined parameter ranges in the memory, receive from a remote sensing device a measured parameter measured at the remote sensing device, determine a first parameter range based on the plurality of predetermined parameter ranges such that the measured parameter is within the first parameter range, transmit a message to the remote sensing device that includes the first parameter range.

In an example embodiment, receiving the measured parameter from a remote sensing device comprises receiving an alert that includes the measured parameter, the alert indicating that the measured parameter is outside of a second parameter range.

In an example embodiment, storing the plurality of predetermined parameter ranges comprises storing a predetermined upper bound and predetermined lower bound for each of the predetermined parameter ranges, and determining the first parameter range comprises determining a first upper bound and a first lower bound of the first parameter range from the predetermined upper bounds and the predetermined lower bounds.

In an example embodiment, a portion of the stored predetermined upper bounds and the stored predetermined lower bounds are associated with a first user of the monitoring system, and another portion of the stored predetermined upper bounds and the stored predetermined lower bounds are associated with a second user of the monitoring system.

In an example embodiment, the processor is further configured to receive a second measured parameter from the remote sensing device, wherein the second measured parameter is outside of the first parameter range, determine which of the first upper bound and the lower bound was crossed based on the second measured parameter, determine which of the first user and the second user is associated with the one of the first upper bound and the first lower bound determined to be crossed, and transmit a message to the determined one of the first user and the second user that is associated with the one of the first upper bound and the first lower bound determined to be crossed indicating the one of the first upper bound and the first lower bound has been crossed.

In an example embodiment, receiving the second measured parameter comprises receiving an alert that includes the second measured parameter, the alert indicating that the second measured parameter is outside of the first parameter range.

In an example embodiment, determining the first upper bound comprises selecting a closest one of the predetermined upper bounds and predetermined lower bounds that is greater than the measured parameter, and determining the first lower bound comprises selecting a closest one of the predetermined upper bounds and the predetermined lower bounds that is less than the measured parameter.

In an example embodiment, when none of the predetermined upper bounds and predetermined lower bounds are greater than the measured parameter, the first upper bound is selected to be undefined, and when none of the predetermined upper bounds and predetermined lower bounds are less than the measured parameter, the first lower bound is selected to be undefined.

In an example embodiment, the first upper bound and first lower bound are both predetermined upper bounds or are both predetermined lower bounds.

In an example embodiment, the parameter is one of temperature, pressure, or humidity.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described.

FIG. 1 is a schematic diagram of an example wireless node network 100. The example wireless node network 100 includes a number of nodes 102a to 102c and a gateway 104. Each node 102a to 102c may establish wireless connections with the gateway 104, as indicated by the solid lines, to facilitate transmitting data to and receiving data from the gateway 104.

Additionally, or alternatively, each node 102a to 102c may establish wireless connections with one or more of the other nodes 102a to 102c of the wireless node network 100, as indicated by the dashed lines, to facilitate transmitting data to and receiving data from the other nodes 102a to 102c, forming what is known as a meshed network. In this example, a node 102a to 102c may communicate with the gateway 104 via one or more other nodes 102a to 102c which act as an intermediary, rather than the node 102a to 102c transmitting data to the gateway 104 directly. For example, node 102a may transmit data to the gateway 104 by first transmitting the data to the node 102b, which node then transmits that data onto to the gateway 104. Similarly, in this example, the gateway 104 may transmit data to the node 102a by first transmitting that data to the node 102b, which node then transmits the data onto the node 102a.

Although the example wireless node network 100 shown in FIG. 1 includes three nodes 102a to 102c and one gateway 104, the network 100 may include a greater or a fewer number of nodes 102a to 102c and more than one gateway 104.

The nodes 102a to 102c and the gateway 104 may utilize any suitable wireless communication protocol to transmit and receive data with each other. For example, the nodes 102a to 102c and the gateway 104 may utilize a short-range wireless communication protocol such as, for example, Bluetooth®, IEEE 802.15.4, WiFi®, or Zigbee®. In another example, nodes 102a to 102c and the gateway 104 may utilize other suitable radio technologies based on, for example, CDMA2000, 3GPP GERAN, 3GPP UTRAN, 3GPP E-UTRAN (LTE) or 3GPP 5G. The nodes 102a to 102c and the gateway 104 may communicate with each other utilizing network-to-device radio links or device-to-device radio links such as 3GPP Proximity-based services (ProSe) making use of a PC5 interface, or a combination of network-to-device and device-to-device radio links.

The gateway 104 may transmit data received from the nodes 102a to 102c to a device remote from the wireless node network 100 such as, for example, a server 106, or some other electronic device (not shown). The server 106 may enable access to data received from the gateway 104 by other client devices (not shown), which client devices may include mobile, or handheld, wireless communication devices such as cellular phones, cellular smart-phones, wireless organizers, personal digital assistants, computers, tablet computers, mobile internet devices, electronic navigation devices, and so forth. In other examples, the gateway 104 may communicate with client devices directly rather than communicating with the client devices via the server 106.

The gateway 104 may transmit data to the server 106 via a network 108. The network 108 may be any suitable wired or wireless network, or combination of wired and wireless networks including, for example, a local area network (LAN), or a wide area network (WAN), or a combination thereof. Wireless communication between the gateway 104 and the network 108 may utilize any suitable short-range wireless communication protocol, as described above, or any utilize any suitable cellular communication protocol including, for example, CDMA2000, 3GPP GERAN, 3GPP UTRAN, 3GPP E-UTRAN (LTE) or 3GPP 5G.

The gateway 104 may be, for example, functionally similar to the other nodes 102a to 102c of the wireless node network but with the additional functionality of transmitting data collected from the nodes 102a to 102c to the server 106 via the network 108, and to transmit data received from the server 106 to the nodes 102a to 102c. Client devices (not shown) may communicate with the server 106, or with the gateway 104 directly, or both, via the network 108.

The nodes 102a to 102c may be any type of wireless device that is suitable for transmitting data to and receiving data from other the nodes 102a to 102c and the gateway 104 of the wireless node network 100. In an example, one or more of the nodes 102a to 102c may include, for example, sensors that are utilized to collect data. The data collected from sensors at the nodes 102a to 102c may then be transmitted to the gateway 104 such that the wireless node network 100 forms a sensor network. The sensors included in the nodes 102a to 102c may be any suitable sensors. Suitable sensors may include, for example, one or more of a temperature sensor, a pressure sensor, a humidity sensor, an accelerometer, a light sensor, a sound sensor, a gas sensor, a pressure sensor such as, for example, a tire pressure monitoring sensor (TPMS), a motion sensor, a velocity sensor, a radio frequency identity (RFID) reader, a location sensor utilizing, for example, a global positioning system (GPS), and so forth. The type of sensor(s) included in the nodes 102a to 102c may depend on, for example, the specific application in which the wireless node network 100 is utilized. In some examples, the different nodes 102a to 102c of the wireless node network 100 may include different sensors.

In an example, the nodes 102a to 102c may include sensors that are utilized to collect data, which may be transmitted by the gateway 104 to a server 106 via a network 108. In an example, the nodes 102a to 102c and the gateway 104 may be utilized to monitor an environment within a vehicle such as, for example, a transport trailer or a shipping container. The nodes 102a to 102c may be installed within the vehicle to take measurements of the environment within the vehicle. The gateway 104 may be installed, for example, on an external surface of the transport trailer or shipping container in order to reduce interference due to the walls of the transport trailer or shipping container to improve communication with the server 106.

Figure 2A:
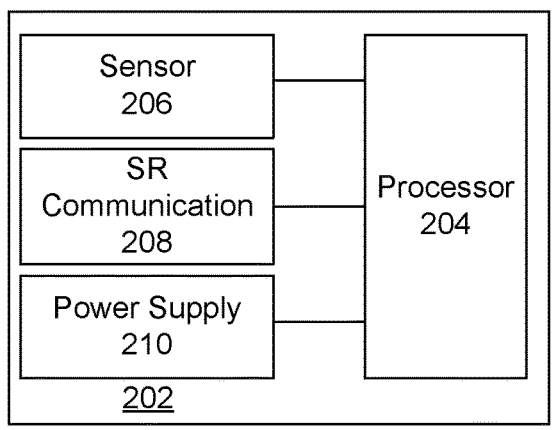
FIG. 2A is a block diagram of an node of a wireless node network in accordance with the present disclosure.
Figure 2B:
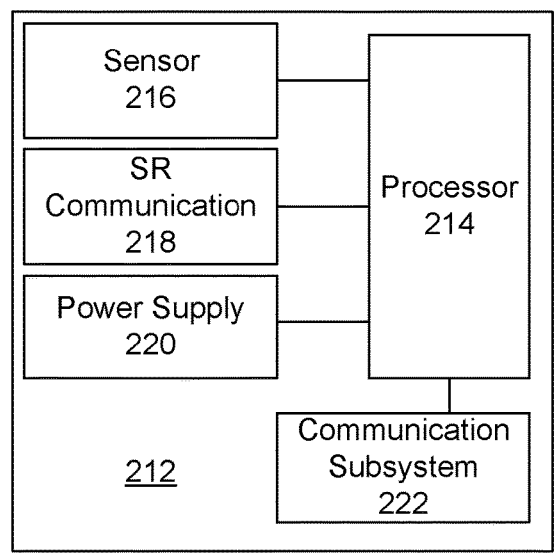
FIG. 2B is a block diagram of an example gateway of a wireless node network in accordance with the present disclosure.

FIGS. 2A and 2B are schematic diagrams of an example node 202 and an example gateway 212, respectively, that may be utilized as the nodes 102a to 102c and the gateway 104 of the wireless node network shown in FIG. 1 for forming a wireless sensor network.

The node 202 includes multiple components, such as a processor 204 that controls the overall operation of the node 202. The node 202 may include sensing functionality performed by a sensor 206. The sensor 206 may include, for example, one or more of a temperature sensor, a pressure sensor, a humidity sensor, an accelerometer, a light sensor, a sound sensor, a gas sensor, a pressure sensor such as, for example, a tire pressure monitoring sensor (TPMS), a motion sensor, a velocity sensor, a radio frequency identity (RFID) reader, a location sensor utilizing, for example, a global positioning system (GPS), and so forth. In an example, short-range (SR) communication functionality, including receiving and transmitting data with other nodes, or a gateway, or both, is performed by a SR communication subsystem 208. A power source 210, such as one or more rechargeable batteries or a port to an external power supply, powers the node 202.

Similarly, the gateway 212 includes multiple components, such as a processor 214 that controls the overall operation of the gateway 212. The gateway 212 may include sensing functionality performed by a sensor 216. The sensor 216 may include, for example, one or more of a temperature sensor, a pressure sensor, a humidity sensor, an accelerometer, a light sensor, a sound sensor, a gas sensor, a pressure sensor such as, for example, a tire pressure monitoring sensor (TPMS), a motion sensor, a velocity sensor, a radio frequency identity (RFID) reader, a location sensor utilizing, for example, a global positioning system (GPS), and so forth. SR communication functionality, including receiving data from and transmitting data to nodes, or another gateway, or both, is performed by a SR communication subsystem 218. A power source 220, such as one or more rechargeable batteries or a port to an external power supply, powers the gateway 212. A communication subsystem 222 is utilized to transmit data to, and receive data from, a remote device, such as for example the server 106 described above, via a network, such as for example the network 108 described above.

In general, the SR communication subsystems 208 and 218 of the node 202 and the gateway 212 and the communication subsystem 222 of the gateway 212 consume a large amount of power compared to other components. In order to conserve power stored in the power supplies 210 and 220, the node 202 and the gateway 212 may be configured to turn on, or "wake up" the communication subsystems 208, 218, 222 periodically for a short time, and otherwise these subsystems 208, 218, 222 may be turned off or powered down. Typically, all of the nodes and the gateway of a wireless node network, such as nodes 102a to 102c and gateway 104 of the example wireless node network 100 shown in FIG. 1, have synchronized awake periods during which time the nodes and gateway(s) are able to transmit and receive data to and from one another. In an example in which the gateway 212 and nodes 202 are installed in a vehicle, such as a shipping container or transport trailer, the time between awake periods of the communication subsystem 222 of the gateway 220 for communication with the server 106 may be anywhere between 15 minutes and 4 hours long if the vehicle is moving and may be 24 hours if the vehicle is not moving. The communication subsystem 222 may remain on for, for example, 1 second, during each awake period.

In an example, the gateway 212 and the nodes 202 may be synchronized to wake up the SR communication subsystems 208, 218 every 5 minutes such that nodes may communicate any parameter measurements of the sensors 206 to the gateway 220. The gateway 220 may buffer the data received from the nodes 202 until a next awake period of the communication subsystem 222 when the data is transmitted to the server 106.

Other components may also be configured to have periodic awake periods and to be otherwise powered down to conserve power. For example, the sensors 206 and 216 of the node 202 and the gateway 212 may be configured to periodically measure a particular parameter, rather than continuously monitoring the parameter.

In some instances, the sensor 206 or 216 may be configured to measure a parameter more frequently than the wake up cycle of the communication subsystems 208, 218, 222. In these instances, the sensors 206 or 216 may make multiple measurements between awake periods of the communication subsystems 208, 218, 222.

In some instances, a node 202 or a gateway 212 may have a stored parameter range that the parameter measured by the sensor 206 or 216 is compared to. The stored parameter range may consist of a minimum value, or a lower bound, and a maximum value, or upper bound. The parameter range may be stored for example, in a memory (not shown) of the node 202 or gateway 212, or in memory that is included in the processor 204 or 214.

It may be desirable that, if the parameter is determined to be outside of the stored parameter range, gateway 212 may wake up the communication subsystems 222 and transmits the measured parameter to the server 106 immediately rather than wait until the next scheduled awake period. In this manner, real-time or near-real-time information related to the measured parameter, including information that the measured parameter has crossed a boundary of a parameter range, may be provided.

The measured parameter may be determined to be outside of the parameter range with the measured parameter is less than, or less than or equal to, the lower bound, or is greater than, or greater than or equal to, the upper bound. The measured parameter may be transmitted to, for example, a server such as the server 106 in the example shown in FIG. 1 in the form of an alert. It may be desirable to receive an indication that a certain parameter or parameters, such as, for example, temperature, pressure, or humidity, are outside of a desired parameter range as soon as possible. For example, the wireless network device may be included within a transport container that contains perishable or frozen goods, and therefore knowing as early as possible that temperature is outside of a desired temperature range it is desirable so that spoilage of the perishable or frozen good may be avoided. Waking up the communication subsystems and transmitting the measured parameter when the parameter is determined to be outside of a parameter range enables real-time or near-real-time alerts that the parameter is outside of a desired range.

In some instances, there may be multiple parameter ranges of interest. However, in order to keep nodes 202 and gateways 212 as simple as possible, for example to reduce costs associated with the nodes 202 and gateways 212, the nodes 202 and gateways 212 may be configured to store only a single parameter range at a time. For such nodes 202 and gateways 212, a method for managing the multiple parameter ranges is needed. For example, remote sensing devices, such as nodes 202 and gateways 212, are configured with only as much memory as needed. Therefore, if certain applications require storing more parameter ranges than the device is configured to store, then the device would require hardware upgrades to increase memory capacity to store the additional ranges. Further, any updates to the parameter ranges, requires the server updating the remote devices, which utilizes increased bandwidth and adds complexity to the server in order for the server to keep track of what remote devices are storing which parameter ranges. Further, having remote devices process additional parameter ranges increases processing power utilized by the device, resulting in further power consumption. Because remote devices are often battery powered, reducing power consumed by the remote device may be desired.

Figure 3:
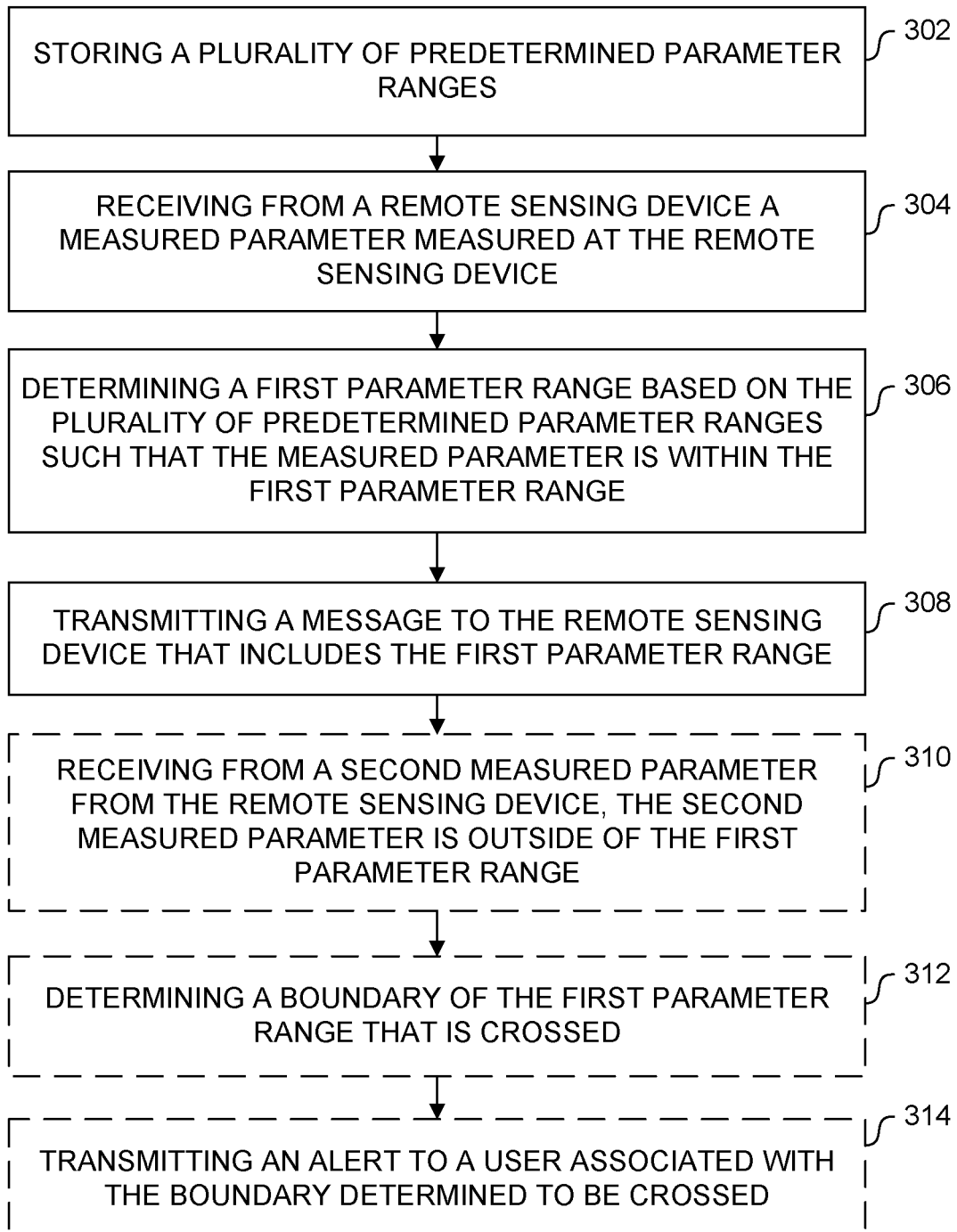
FIG. 3 is a flowchart illustrating a method for providing parameter ranges to remote sensing devices in accordance with an embodiment of the present disclosure.

Referring now to FIG. 3, a flow chart illustrating an example method for maintaining parameter ranges. In an example, the method may be carried about by a server, such as server 106 of the wireless node network 100 shown in FIG. 1. In other embodiments, the method may be carried out by the a gateway, such as gateway 104, to maintain parameter ranges for nodes, such as nodes 102a to 102c of the wireless node network 100 shown in FIG. 1. In some embodiments, a portion of the method may be performed by a processor of a device, such as the processor of such as a server, such as the server 106 shown in FIG. 1, and another portion of the method may be performed by a processor of another device, such as the gateway 104. Coding of software for carrying out such a method is within the scope of a person of ordinary skill in the art given the present description. The method may contain additional or fewer processes than shown and/or described, and may be performed in a different order. Computer-readable code executable by at least one processor to perform the method may be stored in a computer-readable storage medium, such as a non-transitory computer-readable medium. The computer-readable code may be incorporated into an operating system or may be incorporated into a stand-alone application.

At 302, a plurality of predetermined parameter ranges are stored. The plurality of predetermined parameter ranges may be stored at, for example, a server, such as server 106 shown in FIG. 1, or in a memory that is accessible by the server, for example, over a network, such as the network 108 shown in FIG. 1. The predetermined parameter ranges may relate to any suitable parameter that is measurable by a remote sensing device including, for example, temperature, pressure, or humidity. In the present disclose, "remote sensing device" may refer to any device remote from a server that may make measure a parameter and may include, for example, node 202, gateway 212, or the combination of a node 202 and a gateway 212.

The plurality of stored predetermined parameter ranges may be parameter ranges received from one or more users via, for example, client devices in communication with a server, such as the server 106 shown in FIG. 1. Each predetermined parameter range may be associated with a particular user. For example, a predetermined parameter range may be associated with a user from which the predetermined parameter range was received.

The predetermined parameter ranges stored at 302 may be comprised of an upper bound and a lower bound. Table 1 below shows an example of two predetermined parameter ranges related to temperature in which each predetermined parameter range is associated with a different user, USER1 and USER2, and is comprised of an lower bound and an upper bound.

TABLE 1

| | Lower Bound | Upper Bound | User |
|---|---|---|---|
| 1 | −5° C. | 15° C. | USER1 |
| 2 | −10° C. | 10° C. | USER2 |

Although the example included in Table 1 includes two predetermined parameter ranges associated with two users, in general any number of predetermined parameter ranges may be stored, and any number of users may be associated with the stored predetermined parameter ranges. Further, although the predetermined parameter ranges included in Table 1 are stored as upper and lower bounds, in general the plurality of predetermined parameter ranges may be stored in any other suitable way.

At 304, a measured parameter measured at a remote sensing device is received from the remote sensing device. In an example, the measured parameter may be received at a server, such as server 106 shown in FIG. 1, from a gateway, such as gateway 104. The parameter that is transmitted by the gateway may have been measured by a sensor included in the gateway, such as sensor 216 included in the gateway 212 shown in FIG. 2B, or may have been measured by a sensor included in a node that is in communication with the gateway, such as the sensor 206 included in a node 202.

In an example, the measured parameter received at 304 may be included in an alert received from the remote sensing device indicating that the measured parameter is outside of a parameter range previously stored at the remote sensing device. The parameter range may be a parameter range that has been previously determined, as described below at 306, and transmitted to the remote sensing device, as described below at 308. In this example, the remote sensing device has determined that the measured parameter is outside of the previously stored parameter range, and in response to determining that the measured parameter is outside of the stored parameter range, has transmitted an alert. The alert may indicate that the measured parameter is outside of the previously stored parameter range, and may indicate which of the lower and upper bounds of the stored parameter range has been crossed.

At 306, a first parameter range is determined based on the stored plurality of predetermined parameter ranges and the measured parameter received at 304. The first parameter range is determined such that the measured parameter is within the determined first parameter range.

In an example, determining the first parameter range at 306 may comprise selecting one of the stored plurality of predetermined parameter ranges.

In another example, the lower bound of the first parameter range may be determined to be the one of the lower bounds and the upper bounds of the stored plurality of predetermined parameter ranges that is closest to and less than the measure parameter, and the upper bound of the first parameter range is determined to be the one of the lower bounds and the upper bounds of the stored plurality of predetermined parameter ranges. In this example, the first parameter range may be comprised of a lower or upper bound from one of the stored predetermined parameter ranges and a lower or upper bound from another one of the stored predetermined parameter ranges. Further, the first parameter range may be defined by two lower bounds, or by two upper bounds, of the stored plurality of predetermined parameter ranges.

Figure 4:
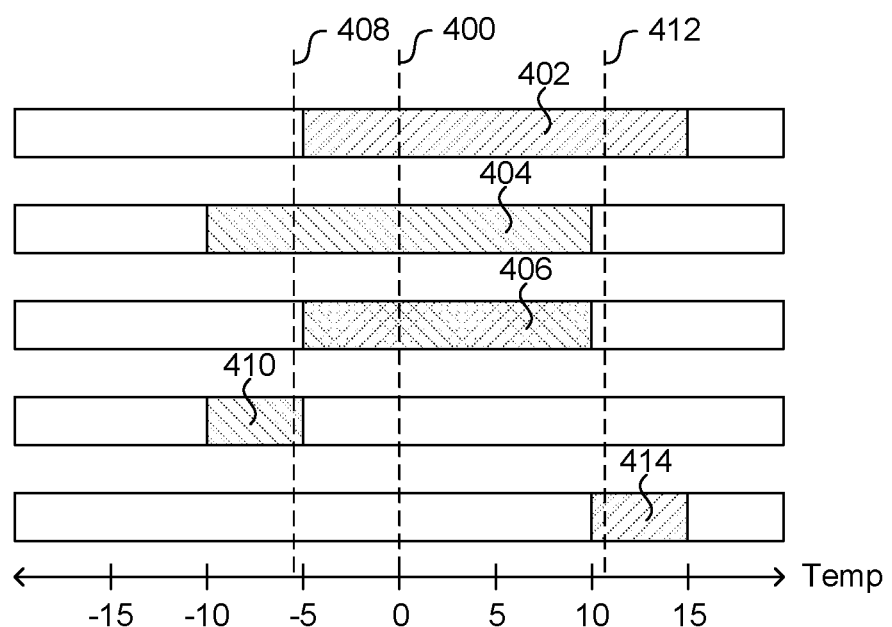
FIG. 4 is a schematic diagram illustrating measured parameters and lower and upper bounds of parameter ranges in accordance with an embodiment of the present disclosure.

FIG. 4 shows a schematic diagram in which a measured parameter is 0° C., illustrated by dashed line 400 and the stored predetermined parameter ranges are as set out in Table 1, and are illustrated by 402 and 404. The lower bound of the determined first parameter range 406 is the lower bound of the first predetermined parameter range 402, −5° C., which is the closest of all of the stored lower and upper bounds that is less than the measured parameter 400. The upper bound of the determined first parameter range 406 is the upper bound of the second predetermined parameter range 404, 10° C., which is the closest of all of the stored lower and upper bounds that is greater than the measured parameter 400.

In another example, if the measured parameter is −6° C., illustrated by dashed line 408, then the lower and upper bounds of the determined first parameter range 410 may be both be the lower bounds of the stored predetermined parameter ranges 402 and 404, −10° C. and −5° C., respectively.

If the measured parameter is, for example, 11° C., illustrated by the dashed line 412, then the lower and upper bounds of the determined first parameter range 414 may both be the upper bounds of the stored parameter ranges 402 and 404, 10° C. and 15° C., respectively.

In these last two examples, the measured parameter, −6° C. and 11° C., are each outside of stored predetermined parameter range, 402 and 404, respectively. In these examples, a user associated with the predetermined parameter range that the measure parameter is outside of may receive an alert, or some other notification, indicating to the user that the measured parameter is outside of the predetermined parameter range that that user is associated with. The alert may be transmitted to the user as described below at 314.

In the event that the measured parameter is less than the lowest lower bound of the stored predetermined parameter ranges, the lower bound of the first parameter range may be determined as indeterminate such that the first parameter range is defined only by an upper bound. Similarly, if the measured parameter is greater than the greatest upper bound of the stored predetermined parameter ranges, the upper bound of the first parameter range may be determined to be indeterminate such that the first parameter range is defined only by a lower bound.

At 308 a message is transmitted to the remote sensing device that includes the first parameter range determined at 306. The message may include, for example, the lower and upper bounds of the first temperature range. The message may also include command to cause the remote sensing device to utilize the first parameter range for comparing to the parameters measured at the remote sensing device.

After the first parameter range is transmitted at 308, a second measured parameter that is outside of the first parameter range may optionally be received from the remote sensing device at 310. The second parameter may be included in an alert received from the remote sensing device indicating that the measured parameter is outside of a parameter range previously stored at the remote sensing device. In this example, the remote sensing device has determined that the second measured parameter is outside of the first parameter range, and in response to determining that the second measured parameter is outside of the stored parameter range, has transmitted an alert. The alert may indicate that the second measured parameter is outside of the first parameter range, and may indicate which of the lower and upper bounds of the first parameter range has been crossed.

At 312, the boundary of the first parameter range that is crossed is optionally determined. As noted previously, the lower bound and the upper bound of the first parameter range correspond to predetermined parameter ranges that may be associated with different users. Thus, determining a boundary that is crossed at 312 may include determining a user associated with the crossed boundary.

Further, the lower bound of the first parameter range may be an upper bound of a stored predetermined parameter range, and the upper bound of the first parameter range may be a lower bound of a stored predetermined parameter range. For example, a lower bound of the first parameter range being crossed, and the lower boundary corresponding to an upper boundary of a stored predetermined parameter range, indicates that the parameter has move from out-of-range to in-range for that stored predetermined parameter range. Similarly, crossing of an upper bound of the first parameter range that corresponds to a lower bound of a stored predetermined parameter range, indicates that that stored predetermined parameter range has moved from out-of-range to in-range.

At 314, an alert is transmitted to a user associated with the boundary that is determined to be crossed at 312. The alert may include any suitable type of electronic message or notification including, for example, an email, a text message including a short message service (SMS) message, a notification via an app, and the like. The alert may be transmitted in accordance with preferences stored in associated with the user. The preferences may include, for example, recipients to which the alert is to be transmitted, which may include names, email address, phone numbers. The preferences may also include the content included in the alert message, which may include whether the parameter has moved out-of-range or has moved in-range, the second measured parameter, the time that the second measured parameter was measured, the location of the remote sensing device, identifying information related to the remote sensing device, which may include one or more of, for example, an identifier of a shipping container in which the remote sensing device is located, an identifier of a shipment included in a shipper container in which the remote sensing device is located, and a description of the user's goods that are included at a location of the remote sensing device.

Embodiments of the present disclosure provide a method and apparatus for maintaining multiple parameter ranges for a remote sensing device. The present disclosure enables utilizing multiple predetermined parameter ranges for remote sensing device that are configured to store a single parameter range at a time. The predetermined parameter ranges may be associated with different users, enabling multiple different users to set parameter ranges, and receive alerts when the measured parameter crosses out of, or in to, the predetermined parameter ranges. The present disclosure enables real-time, or near-real-time alerts that a parameter has crossed a boundary of one of multiple parameter ranges.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for managing parameter ranges of a remote sensing device in a monitoring system, the method comprising:

storing, at a server of the monitoring system, a plurality of predetermined parameter ranges for the remote sensing device; wherein said storing of the plurality of predetermined parameter ranges for the remote sensing device comprises storing a predetermined upper bound and a predetermined lower bound for each of the predetermined parameter ranges;

receiving, by the server, from the remote sensing device a measured parameter measured at the remote sensing device; wherein said receiving the measured parameter from the remote sensing device comprises receiving an alert that includes the measured parameter, the alert indicating that the measured parameter is outside of a second parameter range of the remote sensing device;

determining, by the server, a first parameter range based on the plurality of predetermined parameter ranges such that the measured parameter is within the first parameter range; wherein said determining the first parameter range comprises determining a first upper bound of the first parameter range by selecting a closest one of the predetermined upper bounds and predetermined lower bounds that is greater than the measured parameter and determining a first lower bound of the first parameter range by selecting a closest one of the predetermined upper bounds and the predetermined lower bounds that is less than the measured parameter; and transmitting, by the server, a message to the remote sensing device that includes the first parameter range;

wherein a first one of the plurality of the predetermined parameter ranges is associated with a first user of the monitoring system, and a second one of the plurality of the predetermined parameter ranges is associated with a second user of the monitoring system.

2. The method according to claim 1, further comprising:

receiving, by the server, a second measured parameter from the remote sensing device, wherein the second measured parameter is outside of the first parameter range;

determining, by the server, which of the first upper bound and the lower bound was crossed based the second measured parameter;

determining, by the server, which of the first user and the second user is associated with the one of the first upper bound and the first lower bound determined to be crossed; and transmitting, by the server, a message to the determined one of the first user and the second user that is associated with the one of the first upper bound and the first lower bound determined to be crossed indicating the one of the first upper bound and the first lower bound has been crossed.

3. The method according to claim 2, wherein said receiving the second measured parameter comprises receiving an alert that includes the second measured parameter, the alert indicating that the second measured parameter is outside of the first parameter range.

4. The method according to claim 1, wherein:
when none of the predetermined upper bounds and predetermined lower bounds of the plurality of the predetermined parameter ranges are greater than the measured parameter, the first upper bound is selected to be undefined; and
when none of the predetermined upper bounds and predetermined lower bounds of the plurality of the predetermined parameter ranges are less than the measured parameter, the first lower bound is selected to be undefined.

5. The method according to claim 1, wherein the first upper bound and first lower bound are both predetermined upper bounds or are both predetermined lower bounds.

6. The method according to claim 1, wherein the measured parameter is one of temperature, pressure, or humidity.

7. An apparatus for managing parameter ranges of a remote sensing device in a monitoring system comprising:
a memory;
a processor in communication with the memory and configured to:
store a plurality of predetermined parameter ranges for the remote sensing device in the memory; wherein the processor configured to store the plurality of predetermined parameter ranges for the remote sensing devices comprises the processor configured to store a predetermined upper bound and predetermined lower bound for each of the predetermined parameter ranges;
receive from the remote sensing device a measured parameter measured at the remote sensing device; wherein the processor configured to receive the measured parameter from the remote sensing device comprises receiving an alert that includes the measured parameter, the alert indicating that the measured parameter is outside of a second parameter range of the remote sensing device;
determine a first parameter range based on the plurality of predetermined parameter ranges such that the measured parameter is within the first parameter range; wherein the processor configured to determine the first parameter range comprises the processor configured to select a closest one of the predetermined upper bounds and predetermined lower bounds that is greater than the measured parameter as a first upper bound of the first parameter range, and select a closest one of the predetermined upper bounds and the predetermined lower bounds that is less than the measured parameter as a first lower bound of the first parameter range; and
transmit a message to the remote sensing device that includes the first parameter range;
wherein a first one of the plurality of the predetermined parameter ranges is associated with a first user of the monitoring system, and a second one of the plurality of the predetermined parameter ranges is associated with a second user of the monitoring system.

8. The apparatus according to claim 7, wherein the processor is further configured to:
receive a second measured parameter from the remote sensing device, wherein the second measured parameter is outside of the first parameter range;
determine which of the first upper bound and the lower bound was crossed based on the second measured parameter;
determine which of the first user and the second user is associated with the one of the first upper bound and the first lower bound determined to be crossed; and
transmit a message to the determined one of the first user and the second user that is associated with the one of the first upper bound and the first lower bound determined to be crossed indicating the one of the first upper bound and the first lower bound has been crossed.

9. The apparatus according to claim 8, wherein the processor configured to receive the second measured parameter comprises the processor configured to receive an alert that includes the second measured parameter, the alert indicating that the second measured parameter is outside of the first parameter range.

10. The apparatus according to claim 7, wherein:
when none of the predetermined upper bounds and predetermined lower bounds of the plurality of the predetermined parameter ranges are greater than the measured parameter, the processor configured to select the first upper bound as undefined; and
when none of the predetermined upper bounds and predetermined lower bounds of the plurality of the predetermined parameter ranges are less than the measured parameter, the processor configured to select the first lower bound as undefined.

11. The apparatus according to claim 7, wherein the first upper bound and first lower bound are both predetermined upper bounds or are both predetermined lower bounds of the plurality of the predetermined parameter ranges.

12. The apparatus according to claim 7, wherein the measured parameter is one of temperature, pressure, or humidity.

* * * * *